(12) United States Patent
Anantharam et al.

(10) Patent No.: US 9,438,670 B2
(45) Date of Patent: Sep. 6, 2016

(54) DATA REPLICATION FOR A VIRTUAL NETWORKING SYSTEM

(71) Applicant: INTERNATIONAL BUSINESS MACHINES CORPORATION, Armonk, NY (US)

(72) Inventors: Sushma Anantharam, Cupertino, CA (US); AMitabha Biswas, San Francisco, CA (US); Harshad S. Padhye, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 46 days.

(21) Appl. No.: 13/801,977

(22) Filed: Mar. 13, 2013

(65) Prior Publication Data

US 2014/0279885 A1 Sep. 18, 2014

(51) Int. Cl.
*G06F 17/30* (2006.01)
*H04L 29/08* (2006.01)
*G06F 9/455* (2006.01)

(52) U.S. Cl.
CPC .......... *H04L 67/104* (2013.01); *G06F 9/45533* (2013.01); *G06F 17/30575* (2013.01); *G06F 17/30578* (2013.01); *H04L 67/10* (2013.01)

(58) Field of Classification Search
CPC ................. G06F 17/30115; G06F 17/30575
See application file for complete search history.

(56) References Cited

U.S. PATENT DOCUMENTS

| | | | |
|---|---|---|---|
| 5,966,510 A | 10/1999 | Carbonneau et al. | |
| 7,313,793 B2 | 12/2007 | Traut et al. | |
| 7,624,106 B1 * | 11/2009 | Manley et al. | 707/786 |
| 8,171,349 B2 | 5/2012 | Stern et al. | |
| 8,271,641 B2 | 9/2012 | Fry et al. | |
| 8,347,306 B2 | 1/2013 | Li et al. | |
| 8,843,600 B1 * | 9/2014 | Gabrielson | H04L 41/0806 709/220 |
| 2003/0046396 A1 | 3/2003 | Richter et al. | |
| 2005/0216524 A1 * | 9/2005 | Gomes et al. | 707/201 |
| 2006/0206662 A1 * | 9/2006 | Ludwig et al. | 711/114 |
| 2007/0299882 A1 * | 12/2007 | Padgett | G06F 17/30215 |
| 2008/0200153 A1 | 8/2008 | Fitzpatrick et al. | |
| 2008/0301256 A1 * | 12/2008 | McWilliams | G06F 12/0284 709/214 |
| 2009/0300210 A1 | 12/2009 | Ferris | |
| 2010/0306318 A1 | 12/2010 | Fitzpatrick et al. | |
| 2011/0178985 A1 * | 7/2011 | San Martin Arribas et al. | 707/636 |
| 2011/0289161 A1 | 11/2011 | Rankin, Jr. et al. | |

(Continued)

OTHER PUBLICATIONS

Ayyasamy, S. et al., "A QoS-Aware Intelligent Replica Management Architecture for Content Distribution in Peer-to-Peer Overlay Networks", International Journal on Computer Science and Engineering, 2009, pp. 71-77, vol. 1, No. 2, Engg Journals Publications, India.

Wan, K.H. et al., "An Overlay Network for Replica Placement within a P2P VoD Network", International Journal of High Performance Computing and Networking, Dec. 2005, pp. 320-335, vol. 3, No. 5/6, Inderscience Publishers, Geneva, Switzerland.

(Continued)

*Primary Examiner* — Mohammad S Rostami
(74) *Attorney, Agent, or Firm* — Sherman IP LLP; Kenneth L. Sherman; Joshua A. Schaul

(57) ABSTRACT

Embodiments of the invention provide a method for data replication in a networking system comprising multiple computing nodes. The method comprises maintaining a data set on at least two computing nodes of the system. The method further comprises receiving a data update request for the data set, wherein the data update request includes a data update for the data set. The data set on the at least two computing nodes is updated based on the data update request received.

17 Claims, 9 Drawing Sheets

(56) References Cited

U.S. PATENT DOCUMENTS

| | | | |
|---|---|---|---|
| 2012/0016681 A1 | 1/2012 | Joergensen et al. | |
| 2012/0084445 A1 | 4/2012 | Brock et al. | |
| 2012/0131416 A1 | 5/2012 | Dugan et al. | |
| 2012/0166390 A1* | 6/2012 | Merriman et al. | 707/613 |
| 2012/0174113 A1 | 7/2012 | Pohlmann | |
| 2012/0191817 A1 | 7/2012 | Sayan | |
| 2012/0233321 A1 | 9/2012 | Dreke et al. | |
| 2012/0265741 A1 | 10/2012 | Moon et al. | |
| 2012/0266258 A1 | 10/2012 | Tuchman et al. | |
| 2012/0331029 A1* | 12/2012 | King et al. | 709/201 |
| 2013/0198388 A1 | 8/2013 | Dahn | |
| 2013/0204841 A1* | 8/2013 | Obusek | 707/624 |
| 2014/0046983 A1* | 2/2014 | Galloway et al. | 707/798 |
| 2014/0280949 A1 | 9/2014 | Anantharam et al. | |

OTHER PUBLICATIONS

Mell, P. et al., "The NIST Definition of Cloud Computing", Special Publication, Version 15, Oct. 7, 2009, 2 pages, National Institute of Standards and Technology, Information Technology Laboratory, USA.

U.S. Non-Final Office Action for U.S. Appl. No. 13/802,090 mailed Nov. 4, 2014.

U.S. Final Office Action for U.S. Appl. No. 13/802,090 mailed Apr. 6, 2015.

U.S. Advisory Action for U.S. Appl. No. 13/802,090 mailed Jun. 9, 2015.

U.S. Non-Final Office Action for U.S. Appl. No. 13/802,090 mailed Sep. 25, 2015.

U.S. Notice of Allowance for U.S. Appl. No. 13/802,090 mailed Mar. 16, 2016.

* cited by examiner

DATA REPLICATION FOR A VIRTUAL NETWORKING SYSTEM

BACKGROUND

Embodiments of the invention relate to overlay virtual environments, and in particular, data replication for a virtual networking system.

Network virtualization using overlays use encapsulation, such as virtual extensible local area network (VxLAN) encapsulation and network virtualization generic routing encapsulation (NVGRE), which may be supported by hypervisor and networking vendors. To use VxLAN or NVGRE encapsulation, hypervisor virtual switches are modified to support the respective overlay technology. Incompatibility with encapsulation types makes it necessary to use a translation gateway, which translates between the different packet formats. Often the translation gateways are communication bottlenecks and impact communication performance.

BRIEF SUMMARY

Embodiments of the invention provide a method for data replication in a networking system comprising multiple computing nodes. The method comprises maintaining a data set on at least two computing nodes of the system. The method further comprises receiving a data update request for the data set, wherein the data update request includes a data update for the data set. The data set on the at least two computing nodes is updated based on the data update request received.

Another embodiment provides a networking system comprising one or more data sets and multiple computing nodes. Each data set is maintained on at least one computing node. Each computing node is configured to receive a data update request for a data set maintained on said computing node, wherein the data update request includes a data update for the data set. The data set is updated on the computing node based on the data update request received.

These and other features, aspects and advantages of the present invention will become understood with reference to the following description, appended claims and accompanying figures.

DETAILED DESCRIPTION

Figure 1:
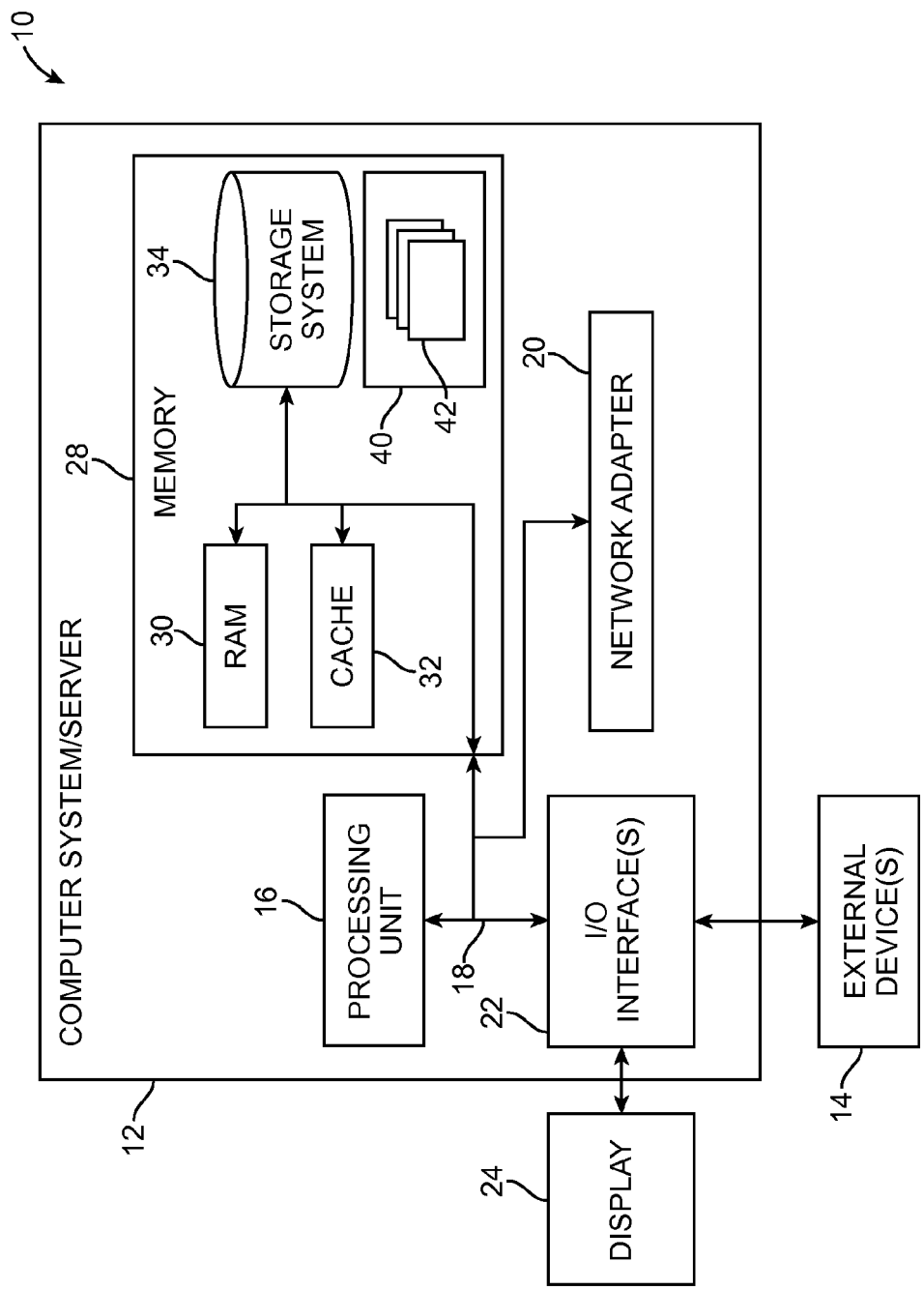
FIG. 1 illustrates a block diagram of an example cloud computing node, in accordance with an embodiment of the invention.

Embodiments of the invention provide a method for data replication in a networking system comprising multiple computing nodes. The method comprises maintaining a data set on at least two computing nodes of the system. The method further comprises receiving a data update request for the data set, wherein the data update request includes a data update for the data set. The data set on the at least two computing nodes is updated based on the data update request received. A data update for a data set is replicated on all computing nodes maintaining the data set.

Another embodiment provides a networking system comprising one or more data sets and multiple computing nodes. Each data set is maintained on at least one computing node. Each computing node is configured to receive a data update request for a data set maintained on said computing node, wherein the data update request includes a data update for the data set. The data set is updated on the computing node based on the data update request received. A data update for a data set is replicated on all computing nodes maintaining the data set.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

FIG. 1 illustrates a block diagram of an example cloud computing node 10, in accordance with an embodiment of the invention. The cloud computing node 10 illustrated in FIG. 1 is only one example of a suitable cloud computing node and is not intended to suggest any limitation as to the scope of use or functionality of embodiments of the invention described herein. Regardless, the cloud computing node 10 is capable of being implemented and/or performing any of the functionality set forth hereinabove.

The cloud computing node 10 comprises a computer system/server 12 that is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. The computer system/server 12 may be practiced in distributed cloud computing environments where tasks are performed by remote processing devices that are linked through a communications network. In a distributed cloud computing environment, program modules may be located in both local and remote computer system storage media including memory storage devices.

The components of the computer system/server 12 may include, but are not limited to, one or more processors or processing units 16, a system memory 28, and a bus 18 that couples various system components (e.g., the system memory 28 and the processor 16). The bus 18 represents one or more types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 12 typically includes a variety of computer system readable media. Such media may be any available media that is accessible by computer system/server 12, and it includes both volatile and non-volatile media, removable and non-removable media.

The system memory 28 can include computer system readable media in the form of volatile memory, such as a random access memory (RAM) 30 and/or a cache memory 32. The computer system/server 12 may further include other removable/non-removable, volatile/non-volatile computer system storage media. By way of example only, a storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to the bus 18 by one or more data media interfaces. As will be further depicted and described below, the system memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

A program/utility 40 including at least one program module 42 may be stored in the system memory 28 by way of example, and not limitation, as well as an operating system, one or more application programs, other program modules, and program data. Each of the operating systems, one or more application programs, other program modules, and program data or some combination thereof, may include an implementation of a networking environment. The program modules 42 generally carry out the functions and/or methodologies of embodiments of the invention as described herein.

The computer system/server 12 may also communicate with one or more external devices 14 such as a keyboard, a pointing device, a display 24, one or more devices that enable a consumer to interact with the computer system/server 12, and/or any devices (e.g., network card, modem, etc.) that enable the computer system/server 12 to communicate with one or more other computing devices. Such communication can occur via I/O interfaces 22. Still yet, the computer system/server 12 can communicate with one or more networks such as a local area network (LAN), a general wide area network (WAN), and/or a public network (e.g., the Internet) via a network adapter 20. As depicted, the network adapter 20 communicates with the other components of computer system/server 12 via the bus 18. It should be understood that although not shown, other hardware and/or software components could be used in conjunction with the computer system/server 12. Examples include, but are not limited to: microcode, device drivers, redundant processing units, external disk drive arrays, RAID systems, tape drives, and data archival storage systems, etc.

Figure 2:
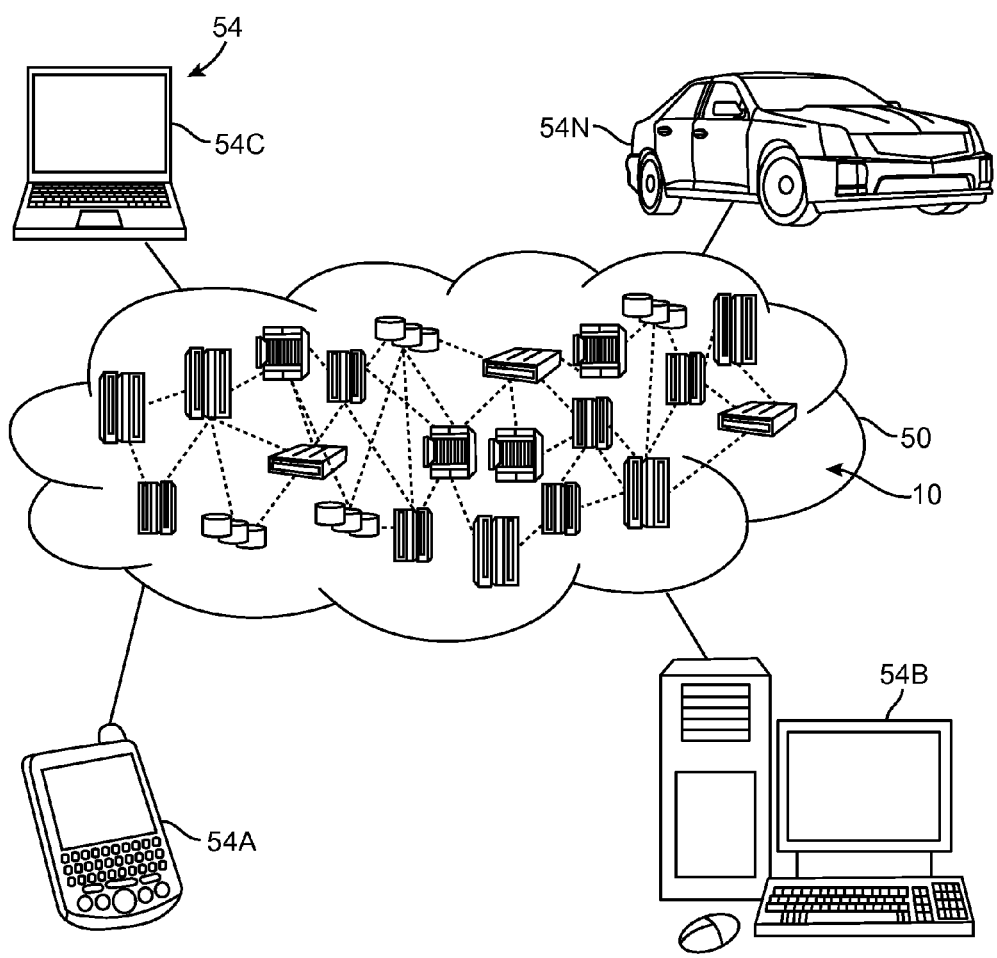
FIG. 2 illustrates an example cloud computing environment, in accordance with an embodiment of the invention.

FIG. 2 illustrates an example cloud computing environment 50, in accordance with an embodiment of the invention. Referring now to FIG. 2, illustrative cloud computing environment 50 is depicted. The cloud computing environment 50 comprises one or more cloud computing nodes 10 with which local computing devices 54 used by cloud consumers, such as, for example, a personal digital assistant (PDA) or a cellular telephone 54A, a desktop computer 54B, a laptop computer 54C, and/or an automobile computer system 54N may communicate. The nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device.

It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
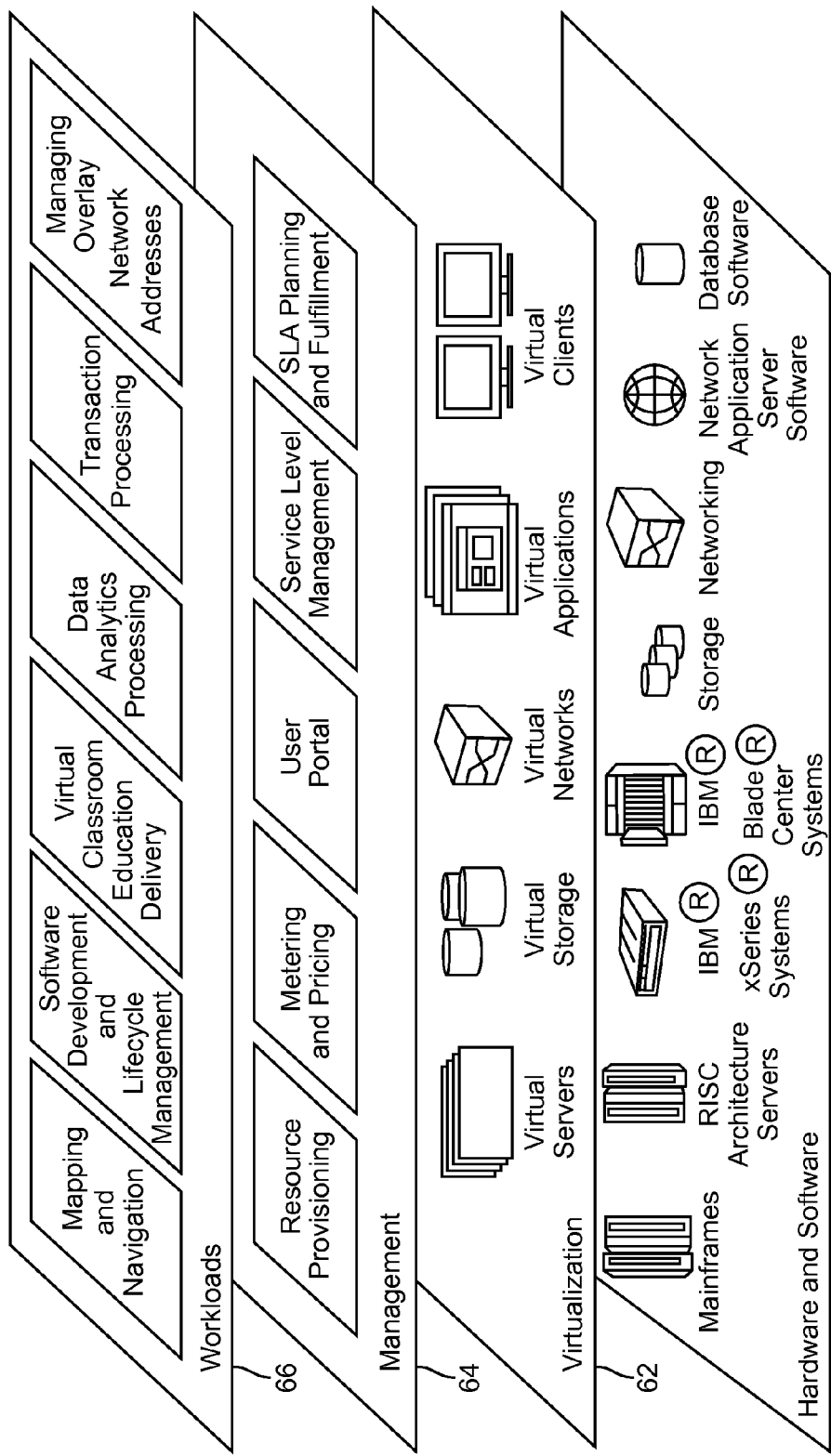
FIG. 3 illustrates abstraction model layers of a cloud computing environment, in accordance with an embodiment of the invention.

FIG. 3 illustrates abstraction model layers of a cloud computing environment 50, in accordance with an embodiment of the invention. Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and encapsulation mapping and communication. As mentioned above, all of the foregoing examples described with respect to FIG. 3 are illustrative only, and the invention is not limited to these examples.

It is understood all functions of the present invention as described herein can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of clustered computing environment now known or later developed.

Embodiments of the invention relate to providing interoperability between hosts supporting multiple encapsulation. One embodiment includes a method that includes mapping packet encapsulation protocol type information for virtual switches. Each virtual switch is associated with one or more virtual machines (VMs). In one embodiment, it is determined whether one or more common encapsulation protocol types exist for a first VM associated with a first virtual switch and a second VM associated with a second virtual switch based on the mapping. In one embodiment, a common encapsulation protocol type is selected if it is determined that one or more common encapsulation protocol types exist for the first virtual switch and the second virtual switch. A packet is encapsulated for communication between the first VM and the second VM using the selected common encapsulation protocol type.

Figure 4:
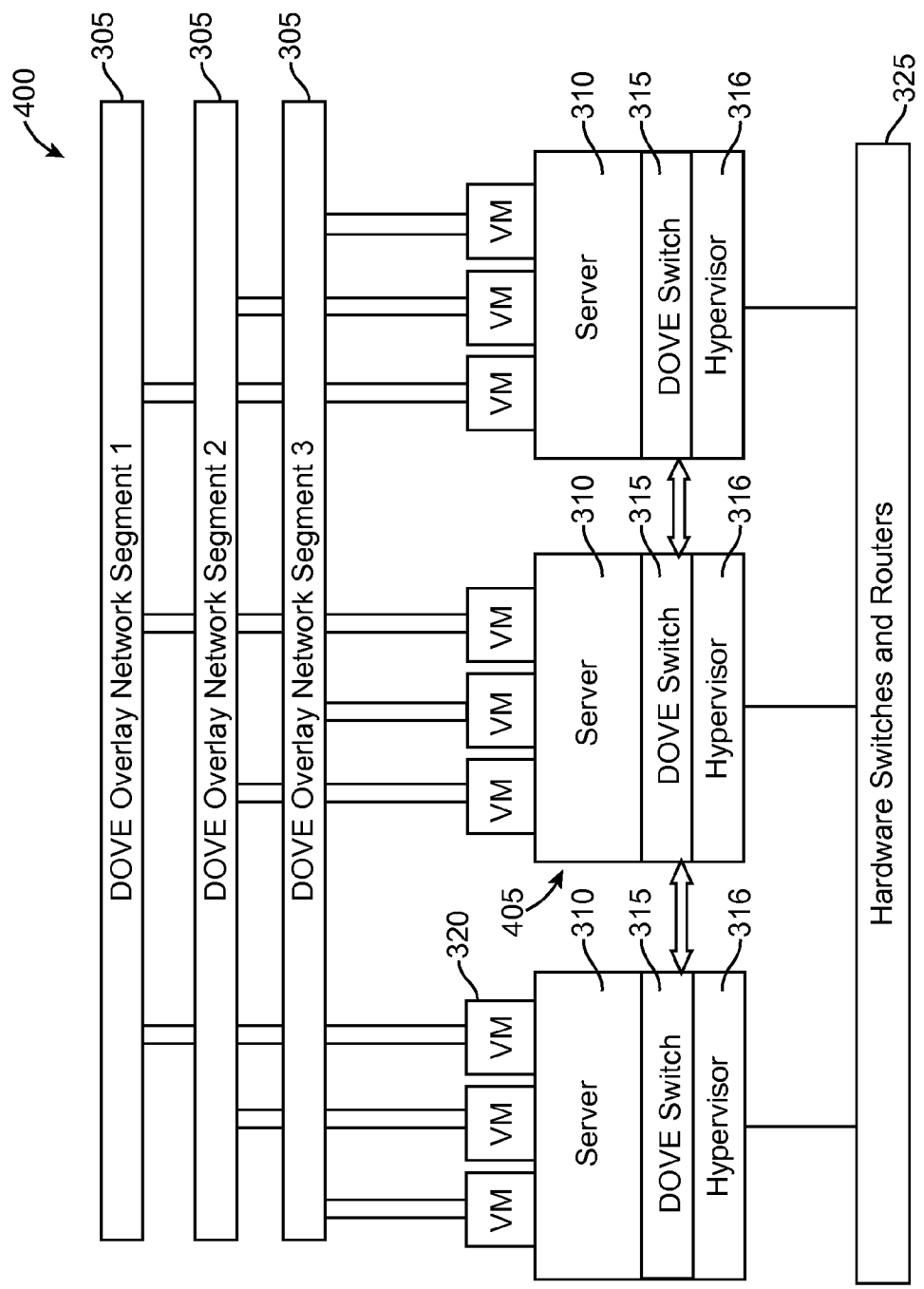
FIG. 4 shows a block diagram illustrating a distributed overlay virtual environment for employing an embodiment of the present invention.

FIG. 4 shows a block diagram illustrating a distributed overlay virtual environment 400 for employing an embodiment of the present invention. In one embodiment, the distributed overlay virtual environment 400 may comprise a distributed overlay virtual Ethernet (DOVE) network system. The distributed overlay virtual environment 400 includes multiple virtual systems (or networks) 405 (also known as DOVE modules in one embodiment) each comprising a server 310 (or host) with a virtual switch 315, hypervisor 316 and VMs 320, which overlay a physical layer 325 (e.g., including physical hardware and software processes) that may include physical switches, routers, servers, gateways, firewalls, etc. The physical layer 325 may also be referred to as the under layer. In one embodiment, overlay network segments 1-N 305 (e.g., overlay network segments 1-3) connect the multiple systems for communication of the different elements (e.g., hypervisors 316, VMs 320), where N is a positive number (e.g., 2, 3, 5, 10, etc.). It should be noted that while three systems 405 are shown, more (or less) systems 405 may be included in the distributed overlay virtual environment 400. In one embodiment, the virtual switches 315 comprise DOVE switches.

In one embodiment, the overlay network segments 1-N 305 create overlay networks between the hypervisors 316 and use encapsulation of packets, where packets originating from one VM 320 are encapsulated (e.g., adding overlay and physical network headers) and the physical layer 325 (underlay) is used to deliver to a server 310 where the target VM 320 resides. In one embodiment, in the physical layer 325 an outer header is used by physical switches to forward packets, where an overlay identification (ID) in an encapsulation header provides traffic isolation. Incoming packets to a virtual switch 315 of a destination server 310 are decapsulated (e.g., the encapsulation headers are stripped from the packet) and delivered to a destination VM 320. In one embodiment, address independence between different virtual systems 405 is supported. For example, two different VMs 320 operating in two different systems 405 may have the same Internet Protocol (IP) address and media access control (MAC) address. As another example, the systems 405 support deploying VMs 320, which belong to the same system 405, onto different hosts that are located in different physical subnets (includes switches and/or routers between the physical entities). In another embodiment, VMs 320 belonging to different systems 405 may be hosted on the same physical host. In yet another embodiment, the systems 405 support VM 320 migration anywhere in a data center without changing the VM 320 network address and losing its network connection.

In one embodiment, the systems 405 encapsulate data with physical path translations based upon policies (e.g., from a distributed policy service (DPS)), and send the encapsulated data between systems 405 that, in turn, is decapsulated and forwarded to a destination VM 320. In one embodiment, the policies describe, in a logical manner, how data is required to be sent over virtual networks without details of the underlying physical entities that performs particular tasks.

In one embodiment, the hypervisors 316 (e.g., VM 320 managers) allow multiple operating systems (e.g., VMs, such as VMs 320) to run concurrently on a host computer. A hypervisor 316 provides abstraction of physical resources to the VMs 320. For example, a physical network interface card (NIC) may be abstracted as a virtual NIC (vNIC) of a system 405. In one embodiment, a virtual switch 315 is a software abstraction of an Ethernet switch in the hypervisor 316 for providing connectivity for VMs 320.

Figure 5A:
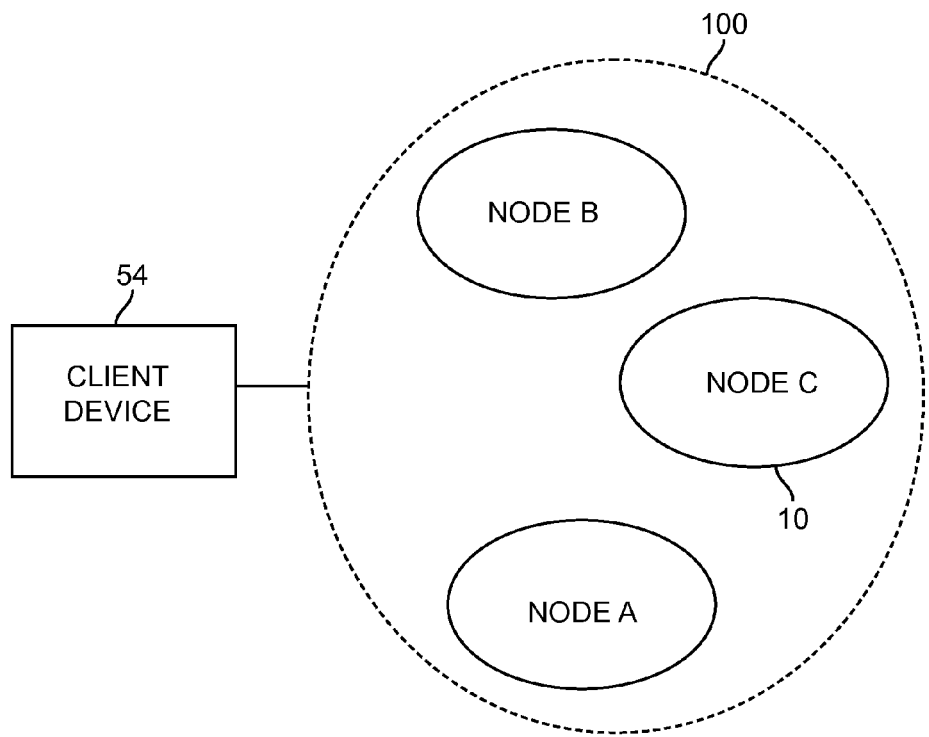
FIG. 5A illustrates an example cloud cluster of a cloud computing environment, in accordance with an embodiment of the invention.

FIG. 5A illustrates an example cloud cluster 100 of a cloud computing environment 50, in accordance with an embodiment of the invention. The cluster 100 comprises one or more nodes 10 of the cloud computing environment 50, such as Node A, Node B and Node C. The nodes 10 of the cluster 100 maintain data for different data sub-groups (e.g., tenants). Specifically, each node 10 of the cluster 100 maintains at least one data set 110 (FIG. 5B) for a data sub-group.

A client device 54 may maintain data on, and/or request data from, a node 10 of the cluster 100. For example, a client device 54 may send a data update for a data set 110 to a node 10 that maintains the data set 110, wherein the data set 110 is updated based on the data update. As another example, a client device 54 may request a data lookup of a data set 110 from a node 10 that maintains the data set 110.

As described in detail later herein, a data set 110 for a data sub-group may be replicated on different nodes 10 of the cluster 100 to support a distributed data system. The nodes 10 of the cluster 100 exchange information with one another to stay in sync. Therefore, when a node 10 is unable to perform a data update on/satisfy a data lookup of a data set 110, another node 10 on which the data set 110 is replicated may perform the data update/satisfy the data lookup.

Each node 10 of the cluster 100 maintains mapping information 120 (FIG. 5B) for the cluster 100. For each data sub-group, the mapping information identifies one or more nodes 10 of the cluster 100 that a data set 110 for the data sub-group is mapped to. Therefore, the mapping information maintained on each node 10 of the cluster 100 includes a mapping for the node 10 (i.e., a mapping of one or more data sub-groups to the node 10) and a mapping for each remaining node 10 of the cluster 100. In one example implementation, each node 10 maintains the mapping information 120 as a lookup table in a system memory 28 (FIG. 1) of the node 10A.

In one embodiment, each node 10 of the cluster 100 is embodied as a server unit 12 (FIG. 1). For example, Node A is represented by a first server unit 16, Node B is represented by a second server unit 16, and Node C is represented by a third server unit 16.

Figure 5B:
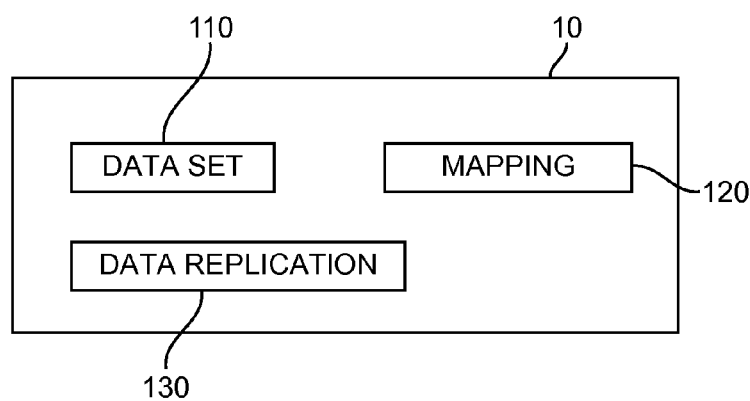
FIG. 5B illustrates a block diagram of a node, in accordance with an embodiment of the invention.

FIG. 5B illustrates a block diagram of a node 10, in accordance with an embodiment of the invention. In one embodiment, each node 10 of a cluster 100 further includes a data replication application module 130 configured for forwarding a data replication request to at least one other node 10 of the cluster 100.

Specifically, the data replication application module 130 of each node 10 is configured to receive a data request 210 (FIG. 6) from a client device 54. In one embodiment, the data request 54 includes a data update for a data set 110 maintained on the node 10. The data replication application module 130 updates the data set 110 based on the data update, and modifies the data request 210 as a data replication request 220. The data replication application module 130 forwards the data replication request 220 (FIG. 6) to all nodes 10 that maintain the data set 110.

Figure 6:
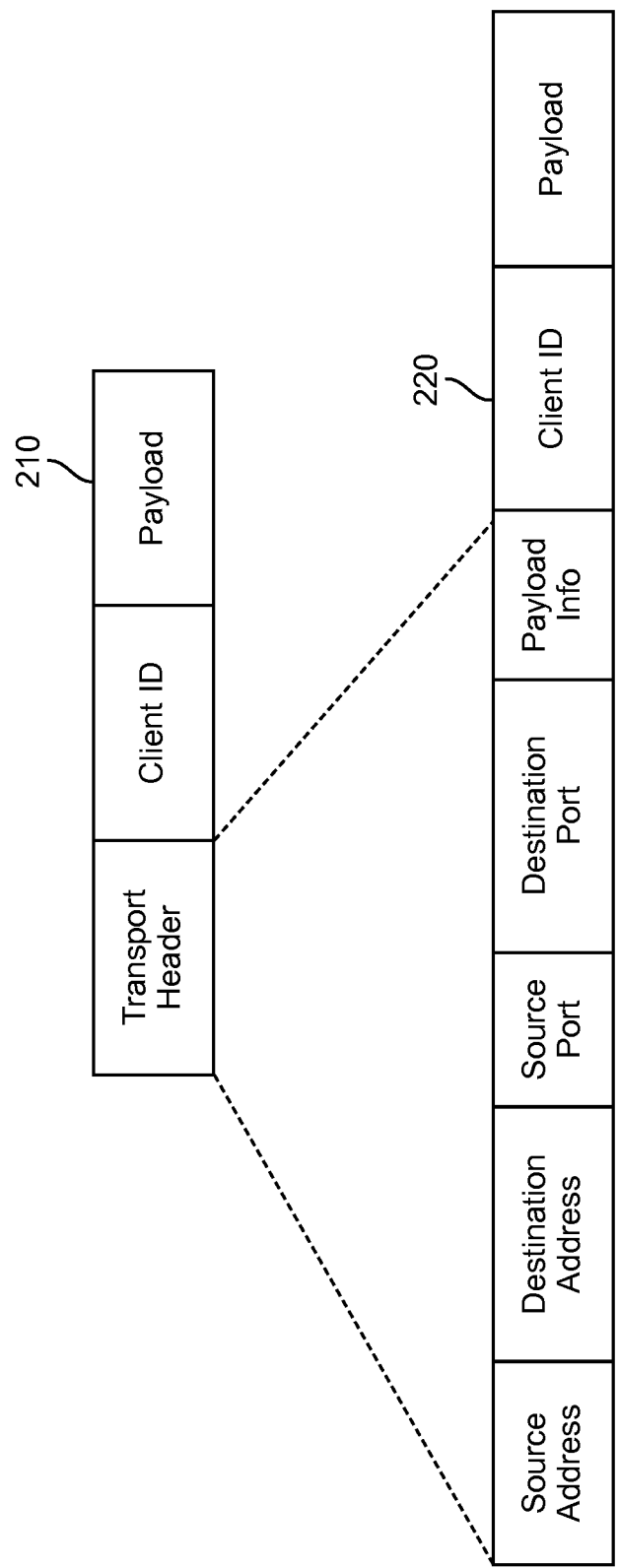
FIG. 6 illustrates an example data request, in accordance with an embodiment of the invention.

FIG. 6 illustrates an example data request 210, in accordance with an embodiment of the invention. In one embodiment, a data request 210 that a node 10 receives from a client device 54 comprises a packet including one or more of the following sections: a transport header section including information identifying the node 10, a client identifier (ID) section including information identifying the client device 54, and a payload section including a data update for a data set 110 maintained on the node 10.

The data replication application module 130 of the node 10 modifies the data request 210 as a data replication request 220. The data replication application module 130 forwards the data replication request 220 to all nodes 10 that maintain the data set 110.

In this specification, let source node denote a node 10 that forwards a data replication request, and let destination node denote a node 10 that receives the data replication request. In one embodiment, the data replication application module 130 of the source node 10 modifies the transport header section of the data request 110 to include the following: a source address (i.e., the address of the source node 10), a destination address (i.e., the address of a destination node 10), a source port (i.e., the port of the source node 10), a destination port (i.e., the port of the destination node 10), and payload information including data to replicate on the destination node 10.

Each node 10 that receives a data update determines whether the data update was encapsulated as a data request 210 from a client device 54, or a data replication request 220 from another node 10. If the node 10 receives the data update from the client device 54, the node 10 forwards a data replication request 220 for the data update to at least one other node 10.

Figure 7:
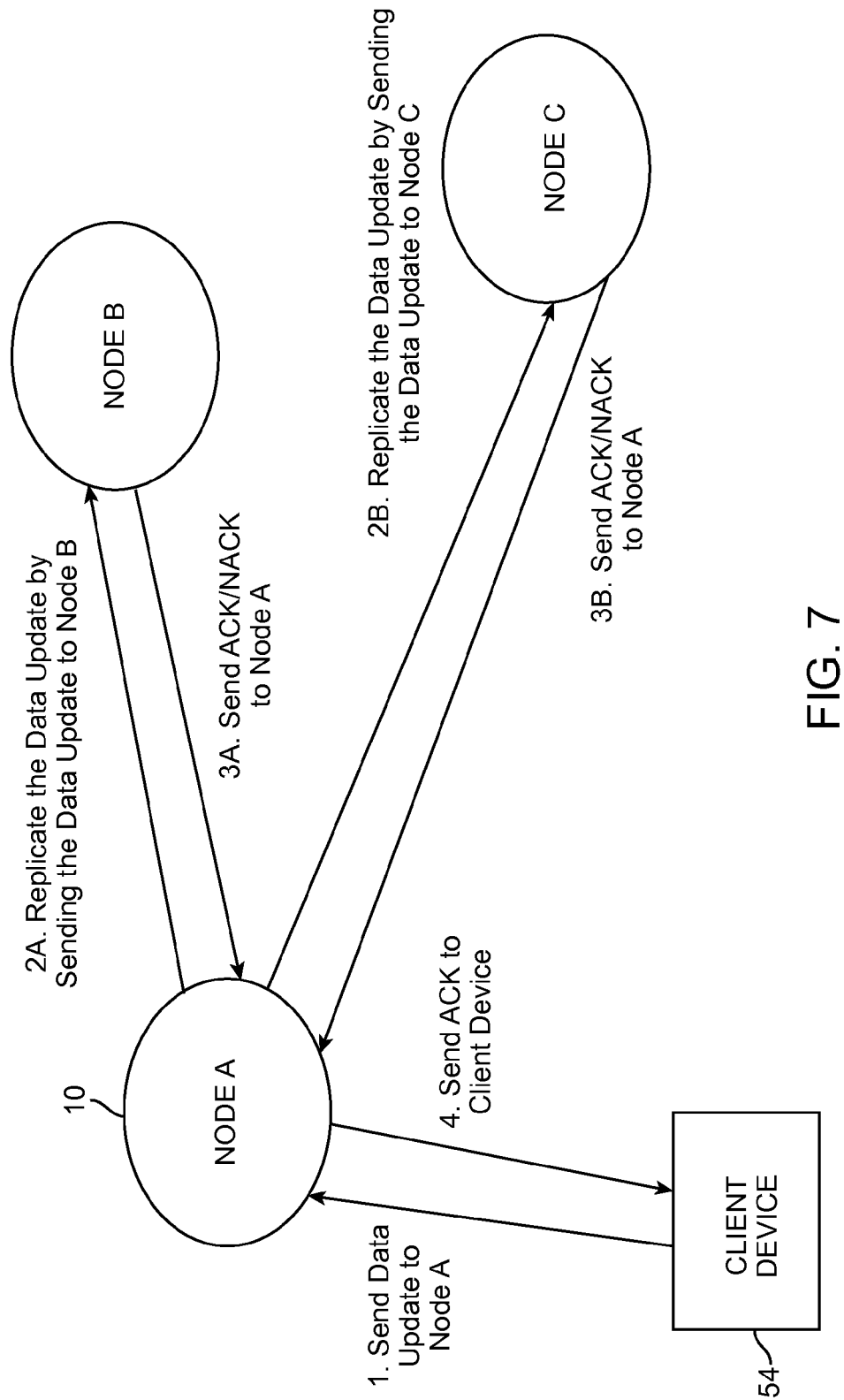
FIG. 7 illustrates data replication for the cluster in FIG. 5A, in accordance with an embodiment of the invention.

FIG. 7 illustrates data replication for the cluster 100 in FIG. 5A, in accordance with an embodiment of the invention. Node A receives a data request 210 from a client device 54, wherein the data request 210 received includes a data update for a data set 110 maintained on Node A. The data set 110 on Node A is updated based on the data update received.

As the date update was received from a client device 54, Node A forwards a data replication request 220 for the data update to at least one other node 10 of the cluster 100. Specifically, based on the mapping information 120, Node A determines which nodes 10 of the cluster 10 also maintain the data set 110 (i.e., which other nodes 10 of the cluster 100 that a sub-group for the data set 110 maps to). For example, Node A determines that Node B and Node C each maintain the data set 110. Node A modifies the data request 210 into a first data replication request 220 for Node B, and forwards the first data replication request 220 to Node B. Similarly, Node A modifies the data request 210 into a second data replication request 220 for Node C, and forwards the second data replication request 220 to Node C.

Upon receiving the first data replication request 220 from Node A, Node B replicates the data update by updating the data set 110 on Node B based on the first data replication request 220. If the replication is successful, Node B generates and sends an acknowledgement (ACK) message to Node A. If the replication is not successful, Node B generates and sends a negative acknowledgement (NACK) message to Node A (e.g., Node B generates and sends a NACK message after fixed period of time allocated for data replication has elapsed).

Similarly, upon receiving the second data replication request 220 from Node A, Node C replicates the data update by updating the data set 110 on Node B based on the first data replication request 220. If the replication is successful, Node C generates and sends an ACK message to Node A. If the replication is not successful, Node C generates and sends a NACK message to Node A.

Upon receiving an ACK message from each node 10 that Node A has forwarded a data replication request 220 to, Node A generates and sends an ACK message to the client device 54, signaling that the requested data update for the data set 110 has been completed.

In one embodiment, data replication occurs transparently to each client device 54 (FIG. 2) utilizing the cluster 100. For example, the data replication occurs without disrupting data updates and data lookups. The data replication also ensures that the cluster 100 consistently provides a client device 54 with requested data.

In one embodiment, Node A may also generate and send to the client device 54 a list of addresses (e.g., IP addresses) of all other nodes 10 (e.g., Node B and Node C) that maintain the updated data set 110. The client device 54 may send a future data request 210 for the data set 110 to any one of the nodes 10 listed based on a particular prioritization scheme (e.g., round robin, load balancing, security, local policy, etc.).

Figure 8:
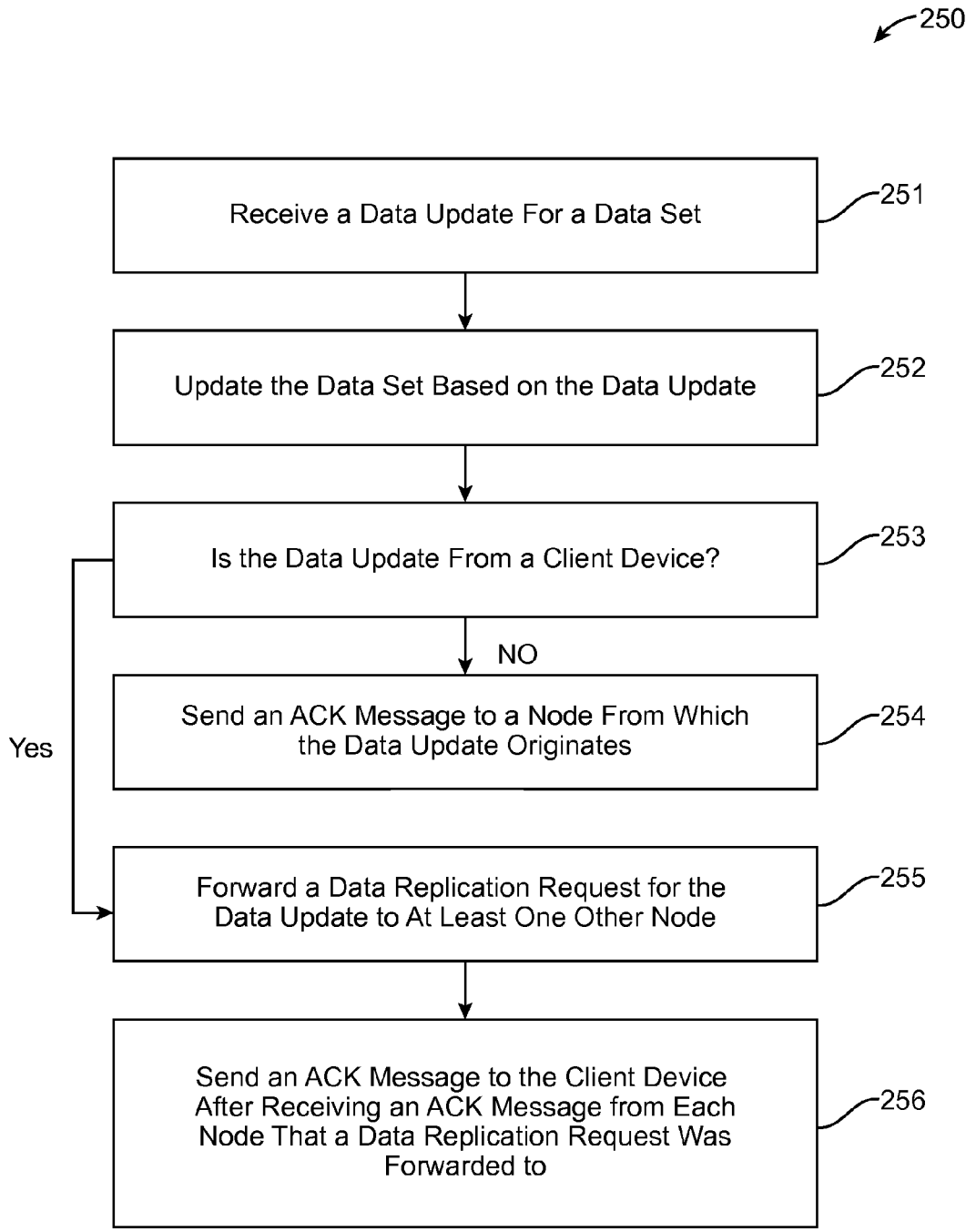
FIG. 8 illustrates a flowchart of an example process of data replication for a virtual networking system, in accordance with an embodiment of the invention.

FIG. 8 illustrates a flowchart of an example process 250 of data replication for a virtual networking system, in accordance with an embodiment of the invention. In process block 251, receive a data update for a data set. In process block 252, update the data set based on the data update. In process block 253, determine if the data update is from a client device. If the data update is not from a client device, proceed to process block 254 where an ACK message is sent to a node from which the data update originates. If the data update is from a client device, proceed to process block 255 where a data replication request for the data update is sent to at least one other node. In process block 256, an ACK message is sent to the client device after receiving an ACK message from each node that a data replication request was forwarded to.

Figure 9:
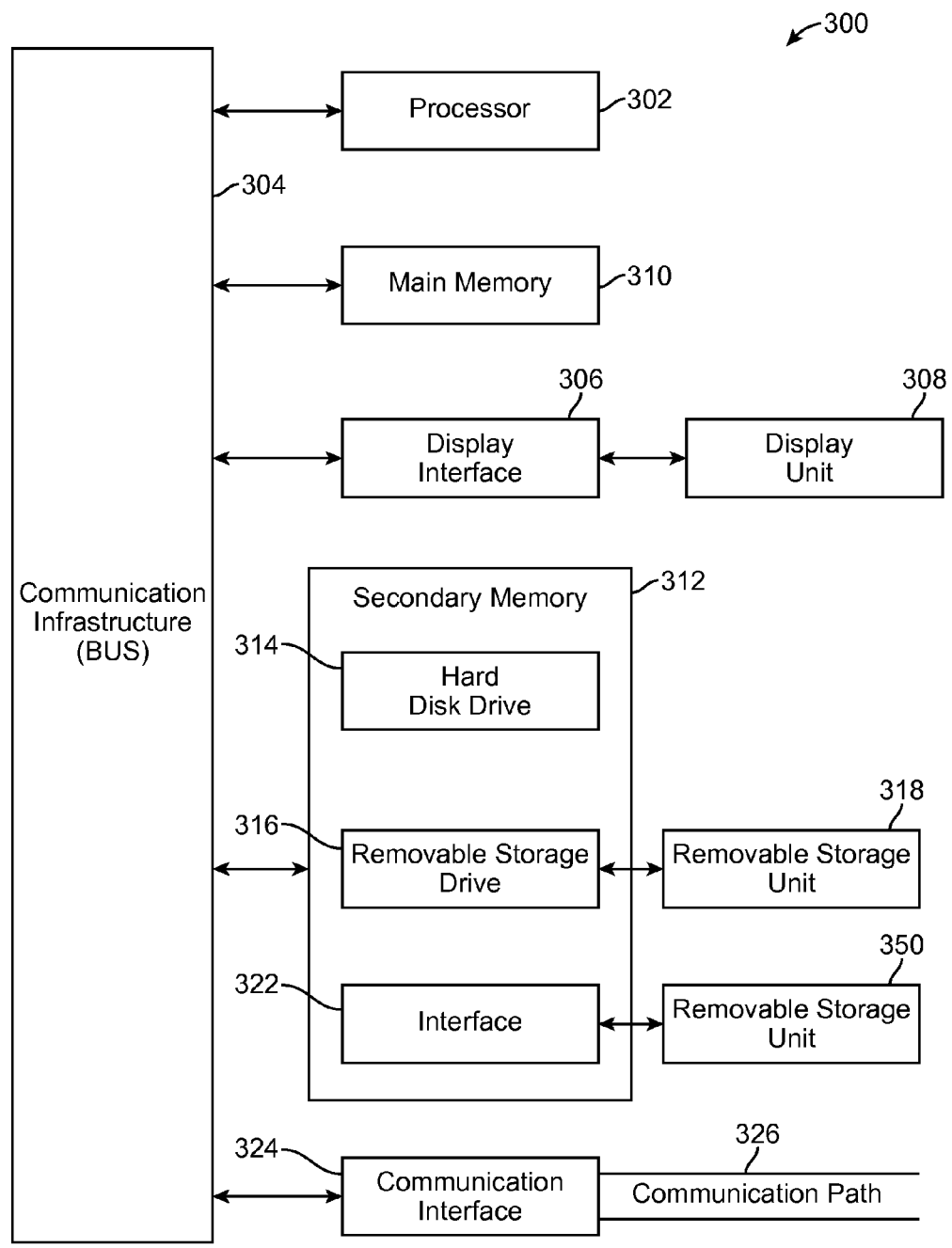
FIG. 9 is a high level block diagram showing an information processing system useful for implementing one embodiment of the present invention.

FIG. 9 is a high level block diagram showing an information processing system 300 useful for implementing one embodiment of the present invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 350 and an interface 322. Examples of such means may include a program package and package interface (such as that found in video game devices), a removable memory chip (such as an EPROM, or PROM) and associated socket, and other removable storage units 350 and interfaces 322 which allow software and data to be transferred from the removable storage unit 350 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

From the above description, it can be seen that the present invention provides a system, computer program product, and method for implementing the embodiments of the invention. The present invention further provides a non-transitory computer-useable storage medium for hierarchical routing and two-way information flow with structural plasticity in neural networks. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for data replication in a virtual networking system comprising multiple computing nodes, wherein the multiple computing nodes include a first computing node, and wherein each computing node comprises a server including one or more resources, the method comprising:
　maintaining a first replica of a data set for a tenant on the first computing node;
　receiving, at the first computing node, a data request for the data set, wherein the data request includes a data update for the data set;
　updating the first replica of the data set based on the data request;
　determining where the data request originates from;
　in response to determining that the data request originates from a client device:
　　determining a second computing node of the multiple computing nodes that maintains a second replica of the data set;
　　modifying the data request by modifying a transport header section of the data request to include an address of the second computing node as a destination address; and
　　forwarding the modified data request to the second computing node to update the second replica of the data set based on the modified data request; and
　in response to determining that the data request originates from another computing node of the multiple computing nodes:

sending an acknowledgement message to the another computing node.

2. The method of claim 1, wherein modifying the data request further comprises modifying the transport header section of the data request to further include an address of the first computing node as a source address.

3. The method of claim 1, further comprising:
maintaining mapping information on the first computing node, wherein the mapping information identifies which one or more computing nodes of the multiple computing nodes maintains one or more replicas for the data set.

4. The method of claim 3, wherein the second computing node is determined based on the mapping information.

5. The method of claim 4, further comprising:
in response to determining that the data originates from the client device:
receiving a first acknowledgement message from the second computing node; and
sending a second acknowledgement message to the client device in response to receiving the first acknowledgment message from the second computing device.

6. The method of claim 2, wherein modifying the data request into the first data replication request further comprises modifying the transport header section of the data request to further include a first port of the first computing node as a source port and a second port of the second computing node as a destination port.

7. A system comprising a computer processor, a computer-readable hardware storage medium, and program code embodied with the computer-readable hardware storage medium for execution by the computer processor to implement a method for data replication in a virtual networking system comprising multiple computing nodes, wherein the multiple computing nodes include a first computing node and wherein each computing node comprises a server including one or more resources, the method comprising:
maintaining a first replica of a data set for a tenant on the first computing node;
receiving, at the first computing node, a data request for the data set, wherein the data request includes a data update for the data set;
updating the first replica of the data set based on the data request;
determining where the data request originates from;
in response to determining that the data request originates from a client device:
determining a second computing node of the multiple computing nodes that maintains a second replica of the data set;
modifying the data request by modifying a transport header section of the data request to include an address of the second computing node as a destination address; and
forwarding the modified data request to the second computing node to update the second replica of the data set based on the modified data request; and
in response to determining that the data request originates from another computing node of the multiple computing nodes:
sending an acknowledgement message to the another computing node.

8. The system of claim 7, the method further comprising: maintaining mapping information on the first computing node, wherein the mapping information identifies which one or more computing nodes of the multiple computing nodes maintains one or more replicas for the data set.

9. The system of claim 8, wherein the second computing node is determined based on the mapping information.

10. The system of claim 7, the method further comprising:
in response to determining that the data request originates from the client device:
receiving a first acknowledgement message from the second computing node; and
sending a second acknowledgement message to the client device in response to receiving the first acknowledgment message from the second computing device.

11. The system of claim 7, wherein modifying the data request further comprises modifying the transport header section of the data request to further include an address of the first computing node as a source address.

12. The system of claim 11, wherein modifying the data request into the first data replication request further comprises modifying the transport header section of the data request to further include a first port of the first computing node as a source port, and a second port of the second computing node as a destination port.

13. A computer program product comprising a computer-readable hardware storage medium having program code embodied therewith, the program code being executable by a computer to implement a method for data replication in a virtual networking system comprising multiple computing nodes, wherein the multiple computing nodes include a first computing node, and wherein each computing node comprises a server including one or more resources, the method comprising:
maintaining a first replica of a data set for a tenant on the first computing node;
receiving, at the first computing node, a data request for the data set, wherein the data request includes a data update for the data set;
updating the first replica of the data set based on the data request;
determining where the data request originates from;
in response to determining that the data request originates from a client device:
determining a second computing node of the multiple computing nodes that maintains a second replica of the data set;
modifying the data request by modifying a transport header section of the data request to include an address of the second computing node as a destination address; and
forwarding the modified data request to the second computing node to update the second replica of the data set based on the modified data request; and
in response to determining that the data request originates from another computing node of the multiple computing nodes:
sending an acknowledgement message to the another computing node.

14. The computer program product of claim 13, wherein modifying the data request further comprises modifying the transport header section of the data request to further include an address of the first computing node as a source address.

15. The computer program product of claim 14, the method further comprising: maintaining mapping information on the first computing node, wherein the mapping information identifies which one or more computing nodes of the multiple computing nodes maintains one or more replicas for the data set.

16. The computer program product of claim 15, wherein the second computing node is determined based on the mapping information.

17. The computer program product of claim 16, the method further comprising:
   in response to determining that the data request originates from the client device:
   receiving a first acknowledgement message from the second computing node; and
   sending a second acknowledgement message to the client device in response to receiving the first acknowledgment message from the second computing device.

* * * * *